L. R. SWOPE.
ANTISKID DEVICE FOR MOTOR VEHICLES.
APPLICATION FILED MAY 2, 1917.

1,266,345.

Patented May 14, 1918.

INVENTOR
Luther R. Swope.
BY Victor J. Evans
ATTORNEY

WITNESSES
Frederick W. Ely

UNITED STATES PATENT OFFICE.

LUTHER R. SWOPE, OF HANOVER, PENNSYLVANIA.

ANTISKID DEVICE FOR MOTOR-VEHICLES.

1,266,345.

Specification of Letters Patent. Patented May 14, 1918.

Application filed May 2, 1917. Serial No. 166,005.

*To all whom it may concern:*

Be it known that LUTHER R. SWOPE, a citizen of the United States, residing at 312 Franklin St., Hanover, in the county of York and State of Pennsylvania, have invented new and useful Improvements in Antiskid Devices for Motor-Vehicles, of which the following is a specification.

This invention relates to improvements in anti-skid devices for use upon motor vehicles, and, with regard to the more specific features thereof, has particular reference to novel devices which are applicable for service as anti-skid devices upon motorcycles and the like.

The object of the invention is to provide an anti-skid device capable of being firmly and securely associated with the ordinary motor vehicle wheel and its associated pneumatic tire in a simple and convenient manner, and one which will be reliable and efficient in operation, of durable and staunch construction, so as not to be liable to become accidentally displaced from an operative position, or to give rise to structural disorders.

Another object resides in an anti-skid chain structure primarily adaptable for use upon the power imparting wheel of a motor cycle, and having peculiar features of construction which enable the same to be continuously carried by the wheel, so that when the chains thereof are not in use, the same may be associated with the spokes of the wheel in a secure manner, so as to eliminate the necessity of removing the structure from the wheel when it is not employed or needed.

Other objects will be in part obvious, and in part pointed out hereinafter.

The invention accordingly consists in the features of construction, combination of elements and arrangement of parts hereinafter more fully set forth, and described, and pointed out with particularity in the appended claims.

In the drawing.

Similar characters of reference denote corresponding parts throughout the several views of the drawing.

Figure 1:
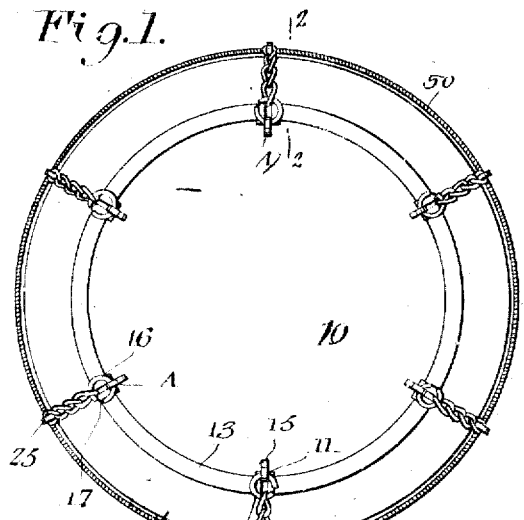
Figure 1 is a side elevation of a motor vehicle wheel rim and tire, illustrating the application of the preferred form of the anti-skid device, comprising the present invention, thereto.

Referring more particularly to the drawings, in the preferred embodiment of the invention, use is made of anti-skid device A, which is adapted to be associated with the wheel 10 of a motor-driven vehicle (not shown) so as to enable the latter to operate with safety over slippery or wet roadbeds, and to provide the necessary grip for the surface of the wheel to effect the propulsion of the vehicle when the latter is operating over sandy or bog-like surfaces.

To this end the device is formed to provide a rim clamp 11, which is preferably formed from steel or the like, and consists of a one-piece structure, stamped from a sheet of material to provide upwardly curved or bent rim engaging fingers 12, the fingers being of a resilient nature, so that when the clamp is positioned upon the rim 13 of the wheel 10, said fingers will firmly grip the rim to retain the clamp in an operative and secure position thereon. In order to connect the chain 14 with the clamp, the latter is provided on one end, between the fingers 12, with an integral, curved, and substantially S shaped hook 15. The end link 16 of the chain is a ring adapted to engage with the hook, and to this end it is provided with a reduced or flattened portion 17, which is sufficiently small to be slipped into the restricted throat 18 of the hook, located between the shank of the latter, and the under surface of the clamp. Then when the ring is turned to bring the portion 17 away from the opening 18, it will be practically impossible to force it out of engagement with the hook, this feature thereby preventing the chain from becoming accidentally disconnected from the clamp when the same is in an applied position around the tire 19 of the wheel.

When applied in an active position upon the wheel 10, the chain is adapted to transversely encircle the tire 19, so as to surround the tread of the latter, and the extremity of the chain, opposite to the link 16, is formed with a hook link 20. A twisted wire element 21 connects the link 20 to one end of a helical spring 22, the latter being trained through an eye 23, formed in a depending projection 24, integrally formed with the clamp 11. The other end of the spring is provided with a hooked extremity which is operable to be engaged with the lower end of the hook 15, and to accomplish this it is necessary to place the spring under tension, thereby drawing the chain 14 tightly upon the outer surface of the tire 19, yet permitting of a slight circumferential movement thereof over the tread of the tire, so as to prevent excessive wear of any single part of the latter.

Figure 2:
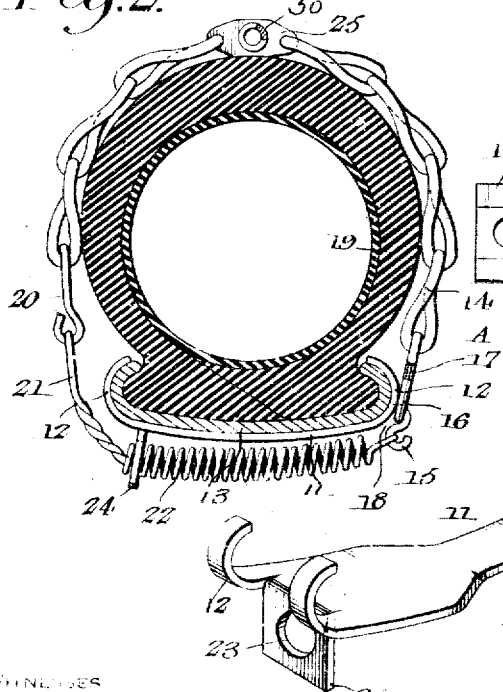
Fig. 2 is transverse sectional view taken along the line 2—2 of Fig. 1 the part being shown on a slightly enlarged scale.
Figure 4:
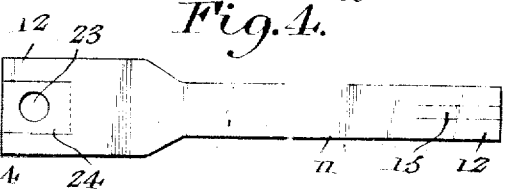
Fig. 4 is a blank view of the material from which the clamp is formed.
Figure 5:
Fig. 5 is a detail sectional view showing a method of uniting the meeting extremities of the tread chain of the invention.
Figure 3:
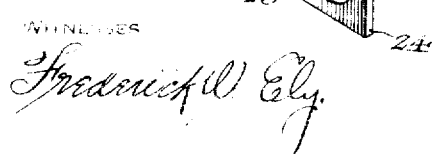
Fig. 3 is a perspective view of one of the securing clamps employed by the present invention.

Situated centrally of the chain element 14 is a master link 25, which is formed with a central opening, said link being disposed so as to lie contiguous to the central part of the tire 19, as is best shown in Fig. 2 of the drawings. A wound wire cable 50 or a like equivalent is trained through the opening of the link and through similar openings formed in the other of the devices A carried by the wheel 10, so that the cable will circumferentially surround the tire 19, and will enhance the grip of the wheel 10 upon a roadbed. The ends of the cable are preferably connected by reducing the diameter of the extremity as at 26, and by screwing the same into the interior of the adjoining extremity 27. This construction is very efficient as it effectively prevents the said extremities from becoming separated.

Figure 7:
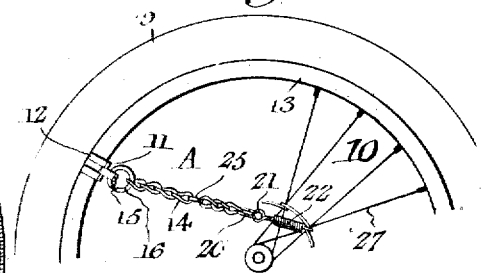
Fig. 7 is a detail view illustrating the manner of associating the tread chains with the spokes of a vehicle wheel, when the device is in an inactive or out of service position.

When the devices A are employed upon motorcycles, it is not necessary to remove the chains from the wheel 10, when the same are not being utilized. This convenience is obtained by simply removing each spring 22 from engagement with the hook 15, carrying its loose end with the cable around the tire 19, so that the chain may lie across and in between the wire spokes 27. Then the free hooked ends of the springs are slipped around the spokes, as shown in Fig. 7, however, to accomplish this it is necessary to place the springs under tension, thus drawing the chain taut, so as to prevent undue vibration or other movement thereof, and at the same time insuring a strong connection between the springs and spokes.

Figure 6:
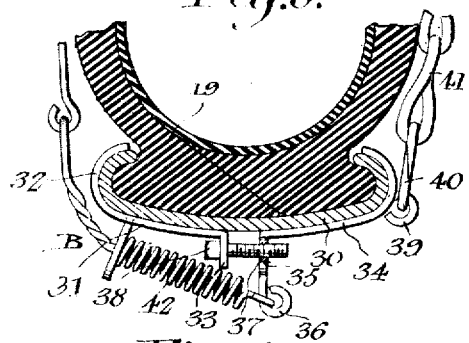
Fig. 6 is a detail sectional view disclosing a slightly modified form of clamp.

In Fig. 6 a slightly modified form of clamp is shown. This clamp, designated by the letter B, consists of a two-part structure instead of the one-piece construction involved in the preferred form of the invention the clamp B being formed in two parts to facilitate its application to the rim 30 of a wheel. To this end the section 31 of the clamp is provided with a curved rim engaging extremity 32 and with depending projection 33 on its opposite extremity. The coöperating section 34 is similarly formed with the exception that the depending projection 35 thereof terminates in an eye 36, and is also provided with a threaded opening 37 to receive a binding screw 38. The latter passes through an opening formed in the projection 35 and is provided with an enlarged head. It will be manifest that by rotating the screw 38, the two sections of the clamp may be drawn together so as to securely fasten the clamp about the rim 30. The section 34 is further provided with a hook 39, to which is secured a split ring 40, carried by a chain element 41. The latter is adapted to encircle the tire of the wheel in the usual manner, and the opposite extremity thereof is provided with a helical spring 42, similar to the spring 22, which is adapted to be connected with the eye 36 of the projection 35, whereby the chain element will be retained in a service imparting position upon the tire of the wheel.

From the foregoing it will be seen that there is provided mechanism whereby the objects of the invention have been achieved, and that all of the advantageous features of utility, adjustment and construction above mentioned are, among others, present. The devices can be cheaply manufactured, easily applied to a motor vehicle wheel, and will be reliable and efficient in operation. In view of the above description, it is thought that the features of the invention will be appreciated by those versed in the art, and therefore, a more extended explanation relative thereto will be accordingly omitted.

I claim:

1. In a device of the class described, the combination with a rim-clamp and an S-shaped hook near one end thereof and a radial projection near the other end provided with an eye; of a chain adapted to extend transversely around the tire, a helical spring at one end of the chain extending through said eye and connected with the outer bend of said hook, and the other end of the chain being connected with the inner bend of said hook and adapted to pass between the shank of the hook and the clamp for the purpose set forth.

2. In a device of the class described, the combination with a rim-clamp and an S-shaped hook near one end thereof, and a radial projection near the other end provided with an eye, of a chain adapted to extend transversely around the tire and having one end connected with the outer bend of said hook, a resilient element arranged in the length of said chain, and a ring shaped link arranged at the other end of the chain for connection with the inner bend of said hook, and said link having a thin portion adapted to pass between the shank of the hook and the clamp for the purpose specified.

In testimony whereof I affix my signature.

LUTHER R. SWOPE.